United States Patent [19]
Annis

[11] Patent Number: 5,483,569
[45] Date of Patent: Jan. 9, 1996

[54] INSPECTION SYSTEM WITH NO INTERVENING BELT

[75] Inventor: Martin Annis, Cambridge, Mass.

[73] Assignee: American Science and Engineering, Billercia, Mass.

[21] Appl. No.: 136,087

[22] Filed: Oct. 14, 1993

Related U.S. Application Data

[63] Continuation of Ser. No. 782,970, Oct. 25, 1991, abandoned.

[51] Int. Cl.$^6$ ............................................. G01N 23/203
[52] U.S. Cl. ...................................... 378/87; 378/57
[58] Field of Search ...................... 250/359.1; 378/57, 378/51, 62, 87, 146, 208, 86, 88

[56] References Cited

U.S. PATENT DOCUMENTS

| | | | |
|---|---|---|---|
| 3,924,064 | 12/1975 | Nomura et al. | 378/57 |
| 4,242,583 | 12/1980 | Annis et al. | 378/57 |
| 4,271,362 | 6/1981 | Stone et al. | 378/51 |
| 4,366,382 | 12/1982 | Kotowski | 378/57 |
| 4,599,740 | 7/1986 | Cable | 378/57 |
| 4,756,015 | 7/1988 | Doenges et al. | 378/57 |
| 4,817,121 | 3/1989 | Shimizu et al. | 378/57 |
| 4,899,283 | 2/1990 | Annis | 378/146 |
| 4,937,451 | 6/1990 | Takada | 250/359.1 |
| 4,956,856 | 9/1990 | Harding | 378/87 |
| 5,026,983 | 6/1991 | Meyn | 250/359.1 |

FOREIGN PATENT DOCUMENTS 260831  12/1985  Japan ........................................ 378/57

OTHER PUBLICATIONS

Bukshpan et al, "Detection of Imperfections by Means of Narrow Beam Gamma Scattering", Materials Evaluation, 33 (10, Oct. 1975, pp. 243–245.

Primary Examiner—Carolyn E. Fields
Attorney, Agent, or Firm—Pollock, Vande Sande & Priddy

[57] ABSTRACT

An inspection system for inspecting objects with penetrating radiation having a conveying means with first and second portions which are separated by a gap. Illumination by penetrating radiation is provided in a scanning plane which is located in the gap, and the system may be used for the inspection of thin objects. Additionally, the illumination may be arranged in the inspection of normal size objects, e.g., suitcases or cargo boxes, so that it does not include a ray which is perpendicular to any face of the object. Further, the relative orientation of the scanning plane and the faces of the object may be arranged so that the illumination does not include a ray which is parallel to any face of the object. A scanning configuration wherein the illumination does not include a ray which is perpendicular or parallel to any face of an object having parallel faces, for example, a rectangular solid, results in a display projection of the object which appears to be three dimensional.

1 Claim, 7 Drawing Sheets

FIG. 7
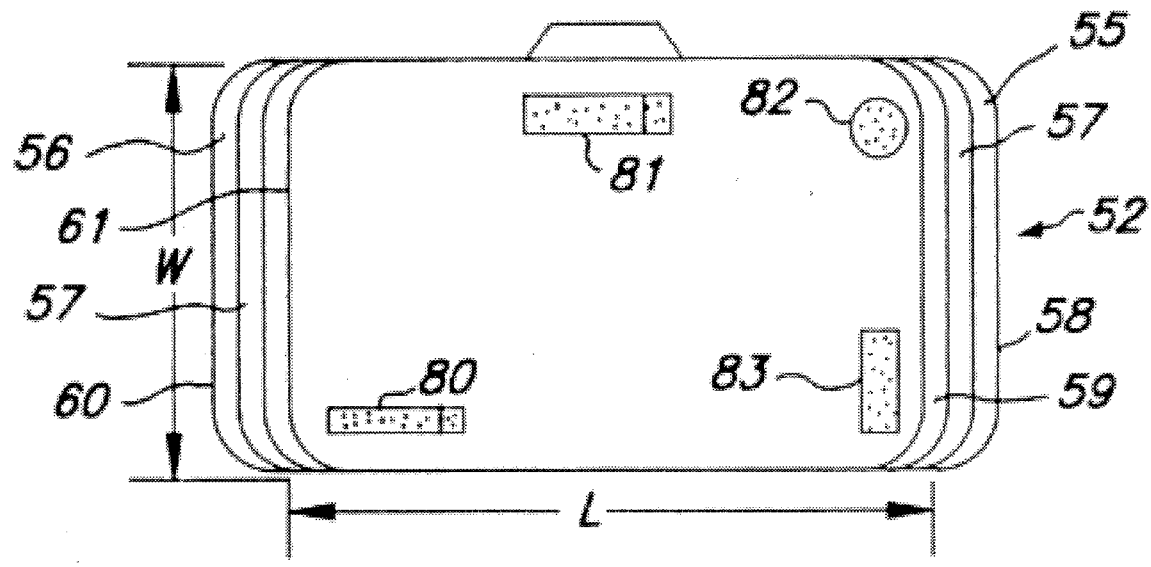
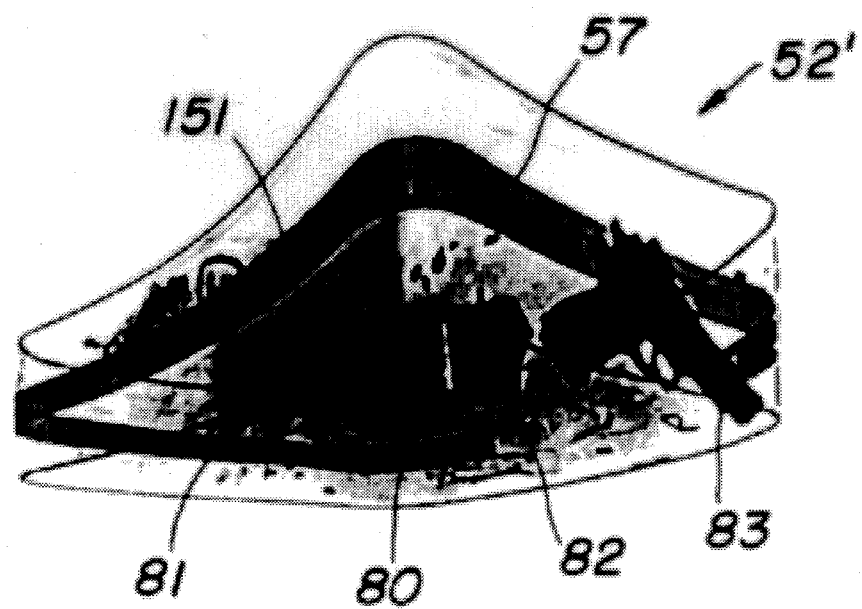
FIG. 10

INSPECTION SYSTEM WITH NO INTERVENING BELT

This application is a continuation continuation of Ser. No. 07/782,970, filed on Oct. 25, 1991, now abandoned.

BACKGROUND OF THE INVENTION

The present invention is directed to an improved inspection system which utilizes penetrating radiation.

Conventional inspection systems which employ penetrating radiation may use one of two methods to inspect objects. In both cases, illumination by penetrating radiation is provided in a scanning plane, and a conveyor carries the object past the scanning plane. The illumination may be a planar beam forming a triangular fan, or a flying spot. Such illumination may be formed so that one extreme end thereof is tangent to the belt while the other extreme end of the illumination is above the top of the object, which is a so-called "horizontal system". Alternately, the illumination may emanate from above or below the conveyor, a so-called "vertical system".

One problem in a "vertical system" is that the image formed by the penetrating radiation is substantially deteriorated because the radiation beam must penetrate the conveyor belt at least once. Although all such systems "erase" the transmission image of the conveyor belt, the belt absorbs a substantial fraction of the radiation which forms the low energy portion of the radiation beam. The image of thin objects is formed principally by these low energy photons because only low energy photons are significantly absorbed by thin objects, and this is particularly true of organic or low atomic number materials.

A more important problem in the inspection of thin objects concerns the scatter image. Thus, when thin objects are inspected with backscatter radiation, it has been found that the signal which is detected by the backscatter detector is so deteriorated by the presence of the conveyor belt that it may not even be useful.

An additional concern in the inspection of objects, and particularly heavier objects than referred to above, is that it is desirable to provide a display which images such objects so that they appear to the viewer to be three dimensional. That is, objects which are inspected by security systems are frequently six sided objects which are substantially in the shape of rectangular solids, for example, suitcases and cargo boxes. However, prior art inspection systems typically provide a display of such objects which is primarily a two dimensional shadowgraph, wherein some of the sides and edges of the object are not even seen. Additionally, in such prior art displays, it may be difficult to see items which are located or packed behind other items through the thickness dimension of the object, as well as items which have a significant geometric shape which lies along the thickness dimension. This can be a major disadvantage, as in many actual inspection situations an operator has only a few seconds to determine whether each object presents a security threat. A display projection which appears to be three dimensional wherein the viewer clearly sees all six sides of the object, as well as items which are located behind other items through the thickness dimension of the object would be more useful and effective to discover hidden contraband.

It is therefore an object of the present invention to provide the ability of inspecting thin objects with penetrating radiation.

It is a further object of the invention to provide the ability of inspecting thin objects with radiation which is backscattered by the objects.

It is still a further object of the invention to provide a display projection of multi-sided objects, which appears to be three dimensional, and in which the contents of the object can be clearly seen.

BRIEF SUMMARY OF THE INVENTION

In accordance with a first aspect of the present invention, it has been recognized that in the "vertical" type system discussed above, the conveyor belt absorbs radiation which is necessary to image a thin object to be inspected, and scatters far more radiation than such an object, thus overwhelming the small scatter signal from the object. To solve this problem, a conveying means is provided which has two portions with an air gap therebetween, and the beam of penetrating radiation is directed so that it passes through the air gap to illuminate portions of the object, which is moved by the conveying means over the air gap.

In a preferred embodiment of the invention, a support means comprising two rods is provided between the two portions of the conveying means to support small objects. With the system of the invention, it is possible to inspect thin objects such as letters for the presence of low Z materials such as plastic explosives or narcotics. As is well known, such low Z materials tend to scatter more radiation then they absorb, and a backscatter detector is used in this system to detect the radiation which is scattered back by the object. While the system of the invention is especially needed to provide backscatter images of thin objects, it is also useful to provide better transmission images of such objects than can be obtained with the conventional "vertical" type system of the prior art.

In accordance with a further aspect of the invention, a display projection of a larger object, for example one having the shape of a rectangular solid such as a suitcase or cargo box is provided which appears to be three dimensional, wherein all six sides of the object can be seen, and wherein items which are located behind each other through the thickness dimension of the object are more visible than in the prior art.

This is achieved by providing an apparatus and method wherein illumination is directed at the passing object so that it does not include a ray which is perpendicular to any face of the object. The illumination can comprise either a fan beam or a flying spot. In accordance with still a further aspect of the invention, the relative orientation between the object and the illumination is arranged such that the illumination does not include a ray which is parallel to any face of the object. When the object is illuminated as described above, the desired display projection is obtained.

BRIEF DESCRIPTION OF THE DRAWINGS

The invention will be better understood by referring to the accompanying drawings, wherein:

FIG. 7 shows a transmission image of a suitcase using the embodiment of FIG. 6.

FIG. 10 shows a transmission image of the suitcase using the arrangements of FIGS. 8 and 9.

DETAILED DESCRIPTION OF THE INVENTION

Figure 1:
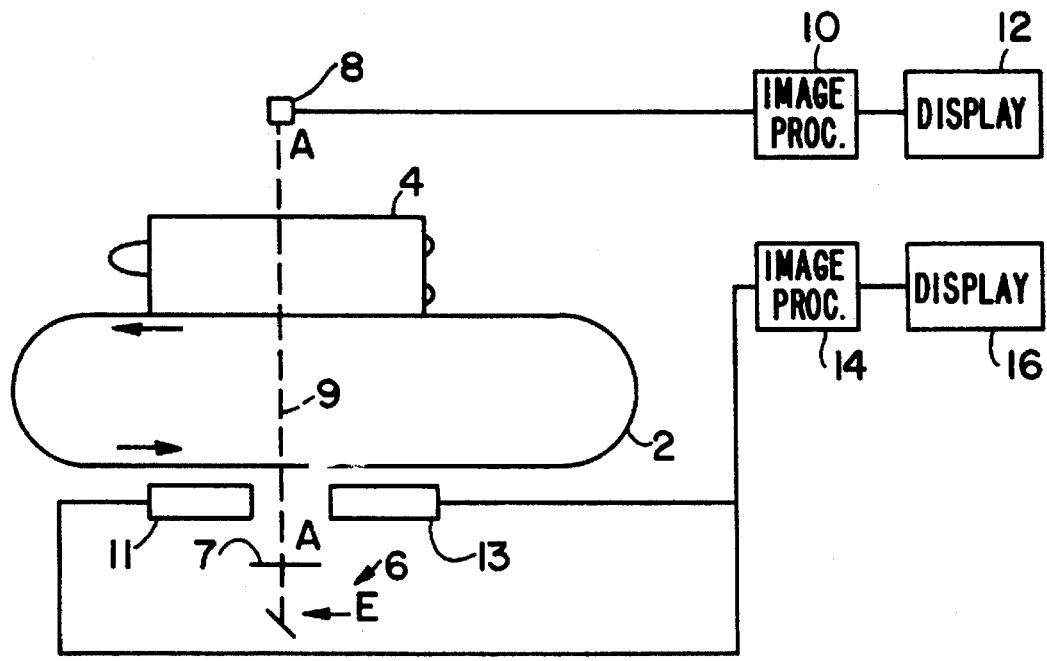
FIG. 1 shows the "vertical" type inspection system of the prior art.

Referring to FIG. 1, a so called "vertical" type inspection system is depicted. It is seen to be comprised of conveying means 2, which transports objects such as suitcases 4 in the direction shown by the top arrow. A source of penetrating radiation 6 is provided, such as x-rays, or other penetrating radiation. The radiation which is emitted by the source 6 is passed through a slitted plate 7 to provide a fan beam 9 lying in plane A—A, which is perpendicular to the plane of the paper.

As the object 4 is transported past the scanning plane, successive sections of the object are illuminated by the fan beam. After the radiation passes through the object, it is detected by detector 8, which is linear in shape in the direction perpendicular to the plane of the paper. The detected radiation is processed in image processing electronics 10, and finally a transmission image of the object 4 is displayed by display means 12.

It is also desirable to provide a scatter image of the object, as items made of low Z materials, such as plastic explosives and weapons, tend to scatter more radiation than they absorb. In this regard, backscatter detectors 11 and 13 may be provided, and the detection signals which they generate, are fed to scatter image electronics 14, and then to display means 16, for providing a display of the backscatter image of object 4.

It has been found that when thin objects are to be inspected, the system shown in FIG. 1 may not perform well. This is because in such a system the radiation beam must penetrate the conveyor belt at least once. Although such systems typically "erase" the transmission image of the conveyor belt, the belt absorbs a substantial proportion of the radiation which forms the low energy portion of the radiation beam. However, the images of thin objects are formed principally by these low energy photons because only low energy photons are absorbed by thin objects, particularly those which are made of organic or low atomic number materials. Since the low energy photons have been absorbed by the conveyor belt, they are not available to form an image of the thin object.

An even more difficult problem concerns the scatter image. Thus, because the conveyor belt is made of low Z material, it generates a large backscatter signal. Since the magnitude of the backscatter signal is dependent on the thickness of the object, if, for example, it is desired to detect the backscatter signal from a very thin object such as an envelope containing a letter, the belt will generate a much larger signal than the envelope, because the belt is about ten times thicker than the envelope. Also, since the belt absorbs low energy photons, there will be less radiation incident on the envelope to be scattered. Thus, in the prior art system shown in FIG. 1, the backscatter signal is difficult to detect because of the large "noise" signal which is generated by the belt.

Figure 2:
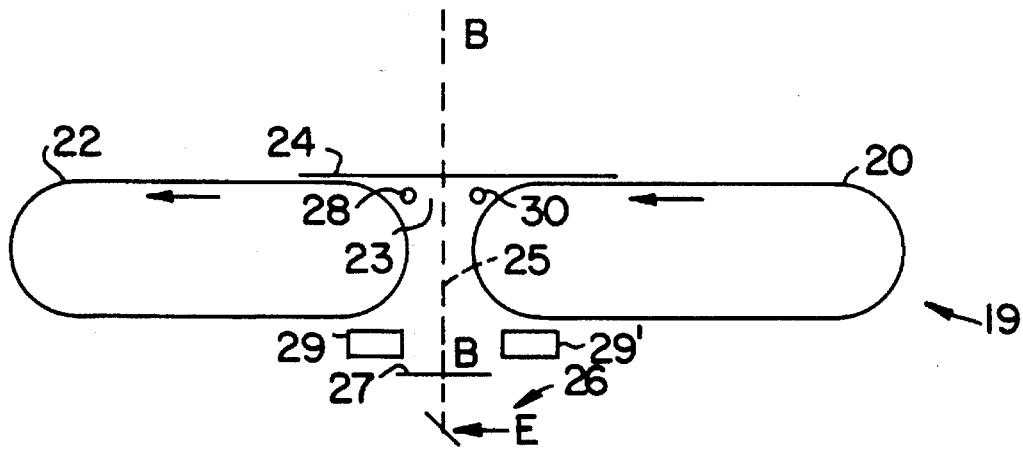
FIG. 2 shows an embodiment of the present invention.

Referring to FIG. 2, an embodiment of the present invention which is particularly useful for detecting relatively thin objects is depicted. Here, it is seen that the conveying means 19 is divided into two portions 20 and 22, with a gap 23 therebetween. The radiation source 26 and slitted plate 27 are located so that the fan beam 25 which is emitted thereby, the plane of which is perpendicular to the paper, along line B—B, lies in the gap 23. This arrangement avoids the problems which are present in the prior art system of FIG. 1, since the thin object 24, for example, an envelope, is directly illuminated, without the need for the radiation to pass through the conveyor belt. Backscatter detectors 29 and 29' are also provided, and their output is fed to backscatter image electronics, such as is shown in FIG. 1.

Since first and second portions of the conveying means may be more separated from each other than is required for transporting small objects, means may be provided to make the effective separation smaller. In the embodiment of FIG. 2, rods 28 and 30 are provided for this purpose.

It should be noted that while in the embodiment of FIG. 2 the conveying means is comprised of two separate conveyor belts, other arrangements which fall within the scope of the invention are possible. For example, a single, continuous belt could be used wherein the upper belt section "dips" to form the gap, and wherein the radiation source is located in the "dip".

Figure 3:
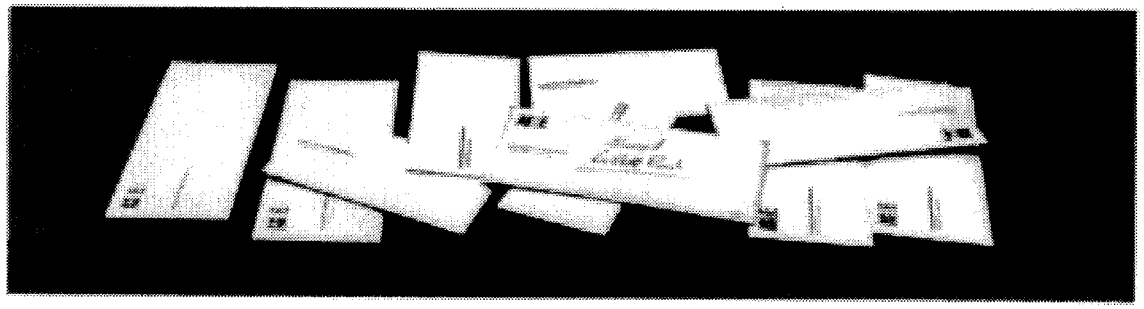
FIG. 3 shows a number of envelopes to be inspected.

FIG. 3 shows a number of envelopes which are to be inspected for the presence of contraband such as hidden explosives or narcotics. In accordance with the invention, these envelopes are transported on conveying means 19 of FIG. 2, and as they pass over the air gap 23 are illuminated by the fan beam which is present in the gap.

Figure 4:
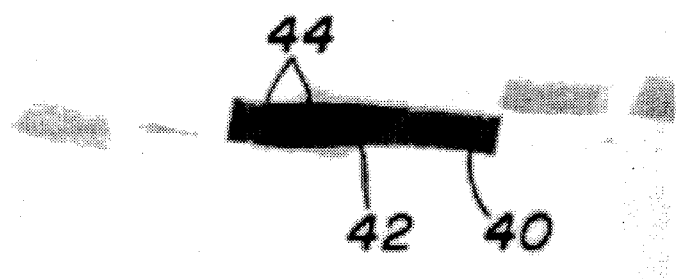
FIG. 4 shows a transmission image of the envelopes.

FIG. 4 shows a transmission image of the envelopes which is displayed by the system of FIG. 2. It is seen that envelope 40 is revealed as containing a letter bomb which is comprised of plastics explosive material 42, and detonator/switch/battery 44. The plastic material 42 appears darker than the contents of the other envelopes because it absorbs more radiation. Also, the detonator/switch/battery 44, because it is made of metallic components having a higher Z than plastic absorbs still more radiation, and appears even darker in the displayed image.

Figure 5:
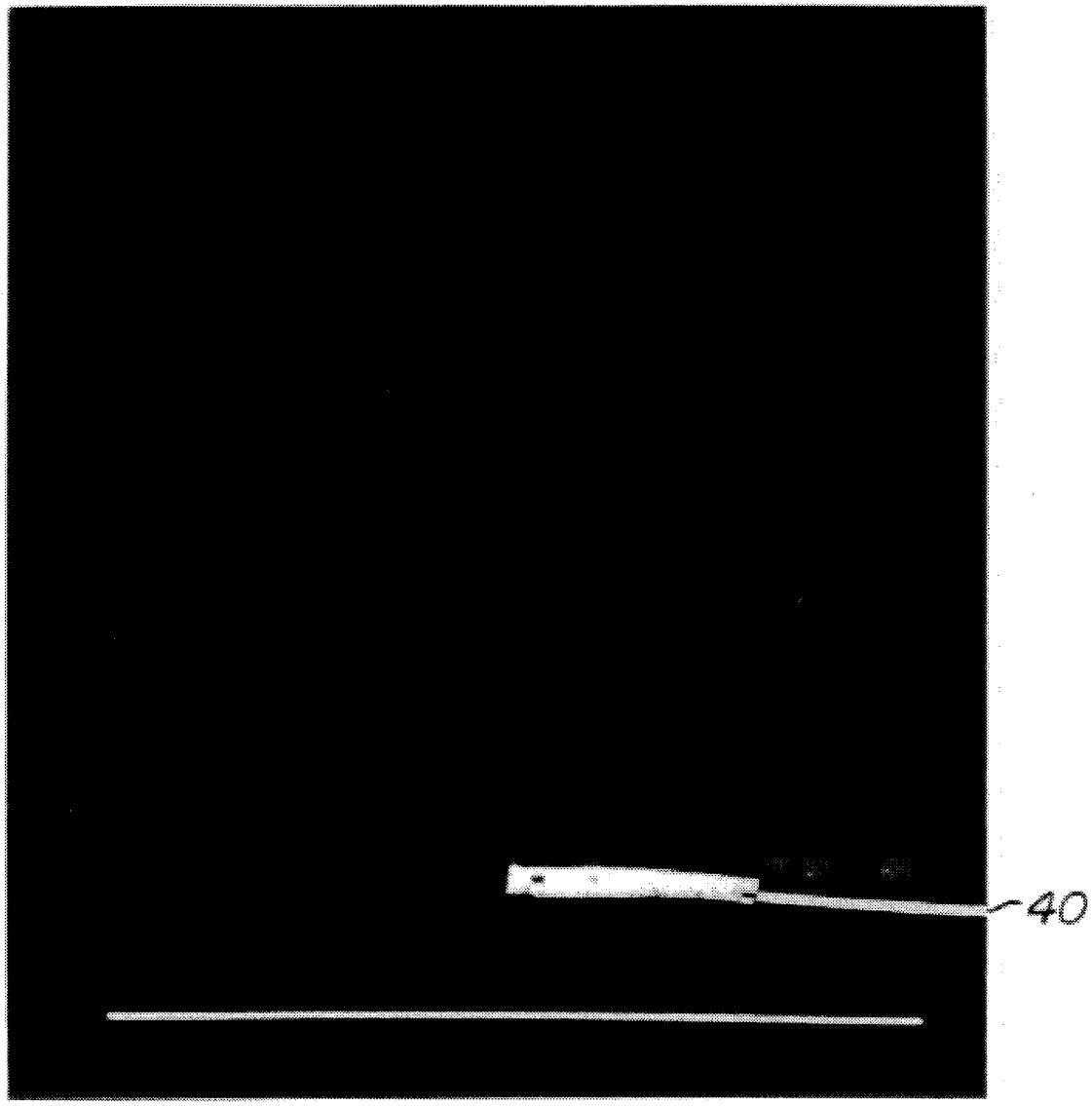
FIG. 5 shows a scatter image of the envelopes.

FIG. 5 shows a backscatter image of the same material as in FIG. 3. Here, the brightness of the image is proportional to the amount of back scattered radiation, and it is seen that envelope 40 appears much brighter than the other envelopes. This is because the plastic explosives material scatters much more radiation than the paper material of which the other envelopes are comprised. Thus, the transmission and/or backscatter images shown in FIGS. 3 and 4 may be used to determine whether a security threat is present in thin objects which are inspected.

Figure 6:
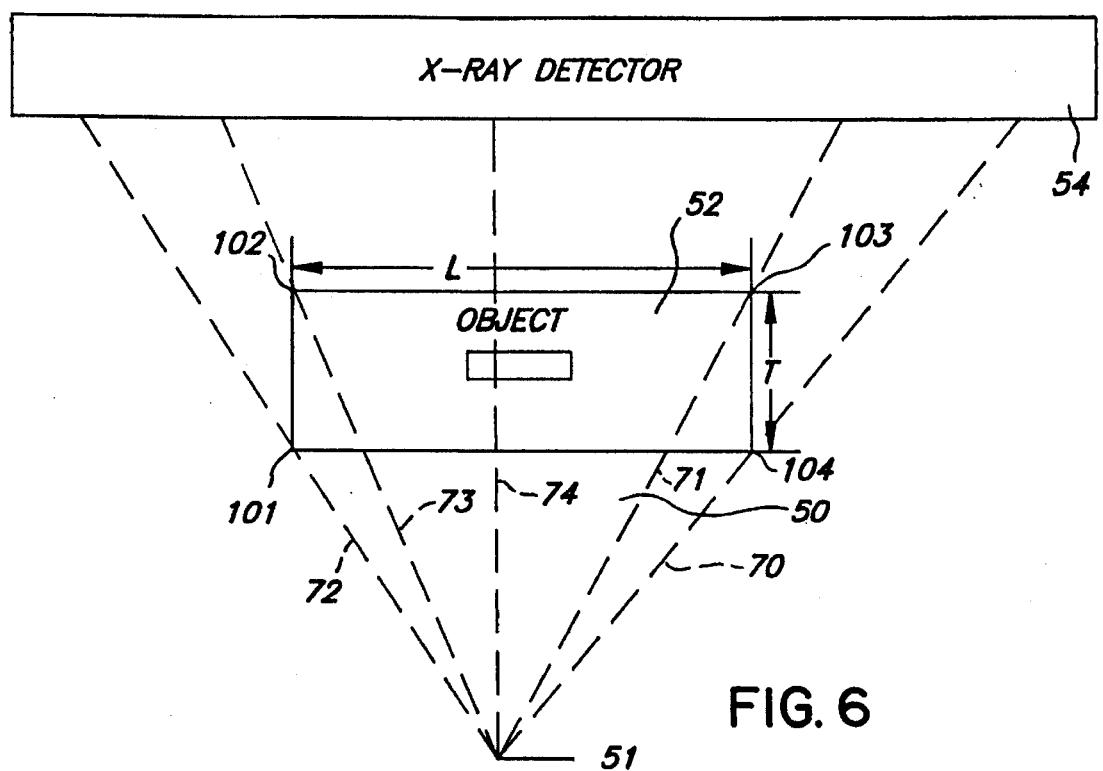
FIG. 6 shows section B—B of FIG. 2 in a first embodiment.

FIG. 6 shows an embodiment of the arrangement depicted in FIG. 2 wherein illumination 50 lies in the plane B—B of FIG. 2. In FIG. 6, a larger object 52 than was considered in relation to FIGS. 3 to 5 is shown, which for example may be substantially in the shape of a rectangular solid, as would be a suitcase or cargo container. The illumination 50 is comprised either of a stationary fan beam or a flying spot, which emanates from a source at location 51.

In the embodiment of FIG. 6, object 52 moves in the direction coming out of the plane of the paper. Illumination 50 is disposed with vertex 51 below the object, and centrally located with regard to a dimension of the object, which is the long dimension or length in FIG. 6. Transmission detector 54 is disposed above the object, and is long enough so that the extreme rays which illuminate the lower corners of the object are incident on the detector. Except for the fact that no part of the conveying means intercepts the radiation beam, the arrangement shown in FIG. 6 is similar to the conventional illumination scheme of the "vertical" type system of the prior art.

FIG. 7 is a sketch which shows the principal components of the transmission image which is obtained using the arrangement of FIG. 6. This image is seen to be primarily a shadowgraph looking through the two opposing large rectangular faces of the suitcase 52. The length of the suitcase L is shown in both FIGS. 6 and 7, and is seen to be represented by the extreme ends of the projection of fan beam 50 on detector 54. The width of the suitcase W which is shown in FIG. 7, is caused by the duration of the signal on detector 54 as the suitcase 52 moves across the scanning plane. The darkness of objects within the suitcase, is proportional to how many photons are absorbed through the thickness of the suitcase along respective scanning lines.

It should be observed that only two sides of the suitcase can be seen in FIG. 7, and these, which are identified with the reference numerals 55 and 56 are at opposite ends of the length dimension of the bag. The location of the outer edge 58 of side 55 is determined by the projection of scanning ray 70 on the detector in FIG. 6, while the location of the inner edge 59 is determined by the projection of scanning ray 71 on the detector. Similarly, referring to the other end of the bag, the location of outer edge 60 of side 56 is determined by the projection of scanning ray 72 on the detector, while the location of inner edge 61 is determined by the projection of scanning ray 73 on the detector. Since zipper area 57 is made of relatively dense material, it appears prominently in sides 55 and 56.

A problem with the image shown in FIG. 7 is that it does not clearly show the contents of the bag. Furthermore, it does not show four of the six sides or faces of the bag. Thus, referring to FIG. 7, four objects are imaged in the bag. Objects 80 and 81 are seen to be thin, elongated objects of medium density, and for example, could be pencils. Object 82 is seen to be a dense, therefore metallic object of circular or cylindrical shape, and would be suspicious as being or containing contraband. Object 83 also is a dense, metallic object, which would cause suspicion, although its shape cannot be clearly determined.

Figure 8:
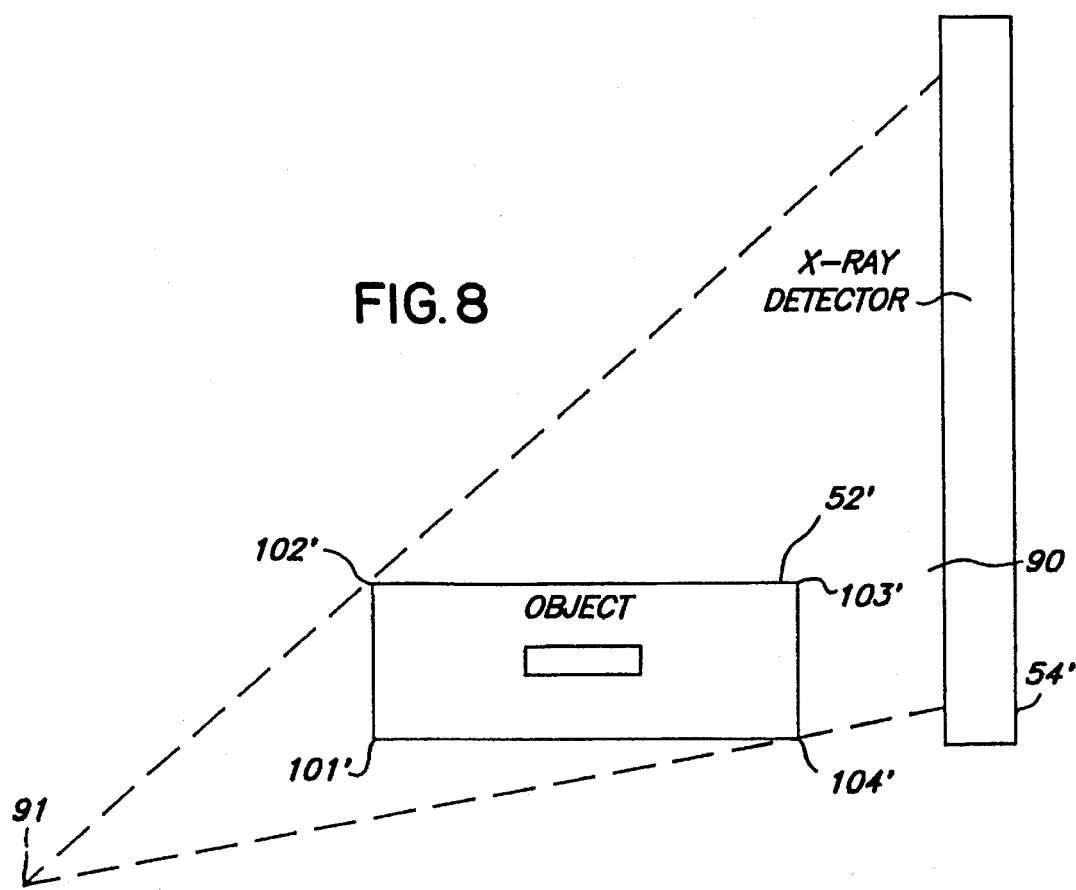
FIG. 8 shows section B—B of FIG. 2 in a further embodiment.

A further embodiment of the invention is illustrated in FIG. 8. In this Figure, illumination 90 is depicted which illuminates object 52', which again moves in a direction coming out of the plane of the paper, on a linear conveying means which moves along a linear path in the inspection zone. Illumination 90 is comprised of either a fan beam or a flying spot, wherein location 91 denotes the position of the x-ray source. After passing through object 52' the radiation is incident on transmission detector 54'.

When the arrangement of FIG. 8 is compared with the arrangement of FIG. 6, an important difference is to be noted. That is, while the illumination in the arrangement of FIG. 6 is oriented so that it includes a line or scanning ray which is perpendicular to a face of the object (ray 74), there is no such line or ray present in the arrangement of FIG. 8.

Figure 9:
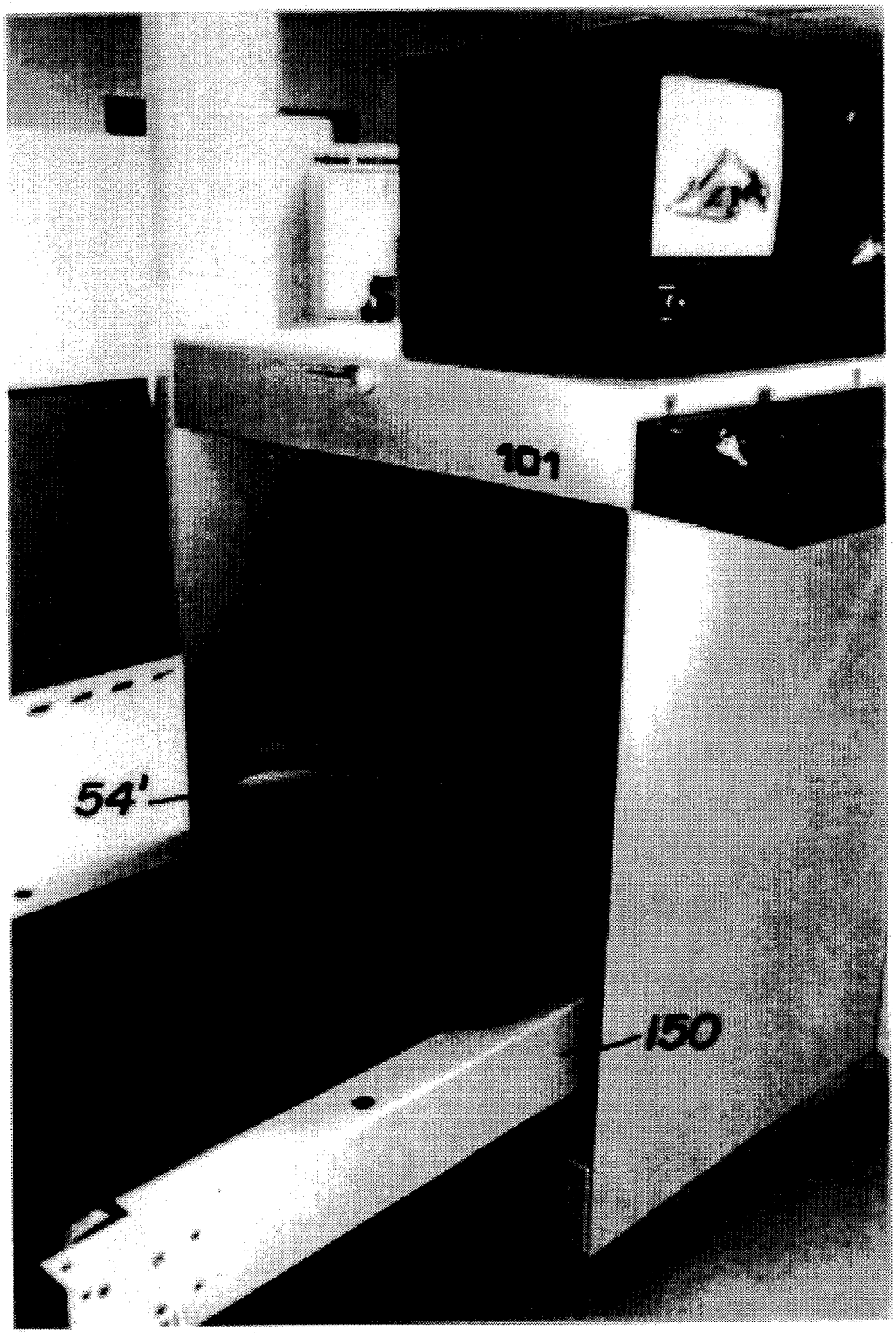
FIG. 9 shows the orientation of a suitcase to be inspected in accordance with an aspect of the invention.

FIG. 8 should also be considered in connection with FIG. 9, which shows the angular disposition of the suitcase on the conveyor belt. In FIG. 9, the scanning plane is perpendicular to the edges of the conveyor belt, while the suitcase 54' is oriented so that its sides and edges are not parallel to the edges 150 of the conveyor belt. In the specific arrangement depicted, in FIG. 9, the edges of the suitcase are at an angle of about 30° to the edges of the conveyor belt. By orienting the suitcase so that its edges are not parallel to the edges of the conveyor belt, the parallelism between the scanning plane and the leading and trailing faces of the suitcase is destroyed. What is significant for this aspect of the invention is that the illumination not include any ray which is parallel to a face of the object. This is preferably accomplished by skewing the object on the conveyor as illustrated in FIG. 9, but may also be accomplished by squaring the object on the conveyor and skewing the scanning plane with respect to the edges of the conveyor.

When the configuration shown in FIG. 8 is used in connection with the arrangement shown in FIG. 9, there is no scanning ray which is either perpendicular or parallel to any face of the object. This results in the projection image which is shown in the photograph of FIG. 10.

The projection of FIG. 10 is seen to be superior as compared with that which is represented in FIG. 7. Thus, in the projection of FIG. 10, the viewer perceives all six sides or faces of the object. Additionally, the entire inside of the bag may be clearly seen, along with its contents. In this regard, objects which lie behind each other along the thickness dimension of the bag may be seen, as may the shape of objects whose "significant" shape lies along the thickness dimension of the bag. Thus, an object of this type is gun 83, the shape of which can be much more clearly seen in the projection of FIG. 10 than in that of FIG. 7.

The reasons why the improved projection of FIG. 10 results may be appreciated by comparing the configurations of FIGS. 6 and 8. Thus, referring to FIG. 6, wherein the illumination includes a ray which is perpendicular to the faces of the suitcase, it is seen that as the beam moves from right to left, it strikes the corners of the object in the order 104, 103, 102, 101. Additionally, it is seen that by far the greatest angular interval is between corners 102 and 103, meaning that most of the rays which are imaged on detector 54 are rays which pass through both large rectangular faces of the object at angles which are not extremely far displaced from the perpendicular. This results in the projection shown in FIG. 7, which is primarily a shadowgraph through the large opposing faces of the bag, wherein contiguous areas through the thickness of the bag are not clearly differentiated from each other.

On the other hand, referring to the configuration of FIG. 8, it is seen that as the scanning beam moves from right to left, the order in which the corners of the bag are intercepted is 104', 103', 101' and finally 102'. This has the effect of elevating corners 102' and 101' above diagonally opposite corners 103', 104' as may be seen in the projection of FIG. 10. This aids in the perception of being able to see the interior of the bag. Additionally, it will be noted that the scanning rays cut through the object in the embodiment of FIG. 8 at a much steeper angle than in the embodiment of FIG. 6. This allows the thickness direction of the bag to be more clearly seen, as items which are located at different locations through the thickness of the bag are more likely to lie along different scan lines than in the embodiment of FIG. 6.

Figure 11:
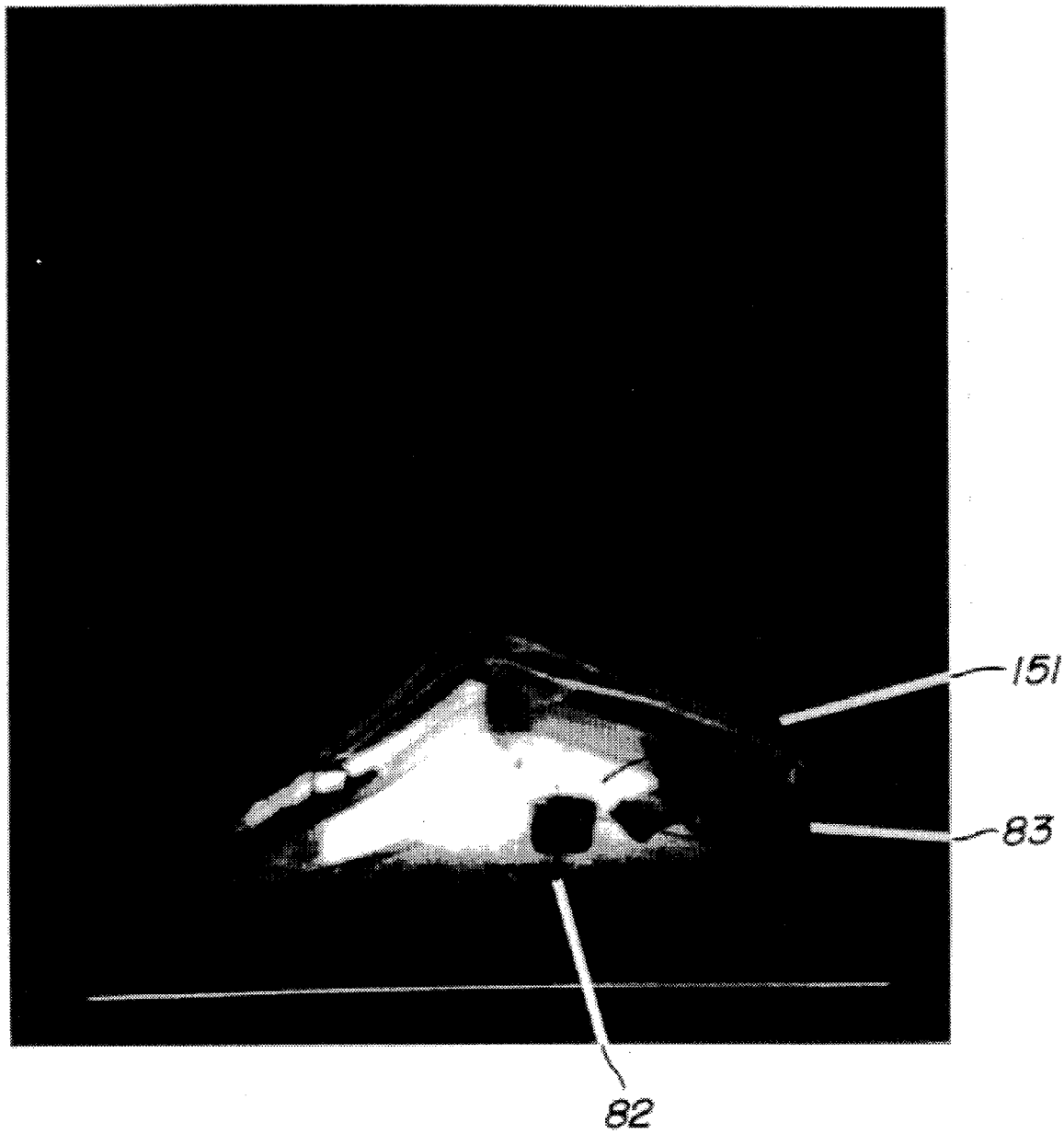
FIG. 11 shows a scatter image of the suitcase using the arrangements of FIGS. 8 and 9.

FIG. 11 shows what a backscatter image of the same bag looks like, and it is seen that the image of the simulated explosive 151 shows up much more clearly in this image.

There thus has been described an invention which is useful in the imaging of relatively thin objects, and which may be used to provide a display of larger objects which appears to be three dimensional. It should be appreciated that different aspects of the invention can be used independently of one another. For example, it would be possible to use the scanning configuration shown in FIG. 8 in a system which does not have a gap in the conveying means, but rather where the image of the conveyor could be "erased". Additionally, it would be possible to use the scanning configuration which is depicted in FIG. 8, without the "skewing" arrangement shown in FIG. 9, and vice versa.

It thus should be understood that while the invention has been described in connection with illustrative embodiments, variations will occur to those skilled in the art, and the invention should be limited only by the claims appended hereto and equivalents.

I claim:

1. A method of inspecting thin objects with x-rays, which objects are thin enough in relation to a conveyor belt used in a system wherein both the object and belt are illuminated with x-rays so that when said belt and object are illuminated, the conveyor belt generates a much larger backscatter signal than the object, comprising the steps of, providing a belt conveying means having first and second belt portions which are separated by a gap, placing said thin objects to be inspected on said belt conveying means for transportion over said gap, providing a source of x-rays, directing the x-rays which are emitted by said source through the gap in the belt conveying means to illuminate said thin objects when they are over said gap, detecting radiation which is backscattered by said thin objects, and displaying an image corresponding to the detected radiation.

* * * * *